United States Patent
Lewis et al.

(10) Patent No.: US 7,076,149 B1
(45) Date of Patent: Jul. 11, 2006

(54) DIGITAL VIDEO APPARATUS USER INTERFACE

(75) Inventors: Debbie Indira Lewis, Norcross, GA (US); Robert Howard Miller, Leawood, KS (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/744,112

(22) PCT Filed: Jul. 20, 1999

(86) PCT No.: PCT/US99/16228

§ 371 (c)(1),
(2), (4) Date: Apr. 11, 2001

(87) PCT Pub. No.: WO00/04538

PCT Pub. Date: Jan. 27, 2000

Related U.S. Application Data

(60) Provisional application No. 60/093,424, filed on Jul. 20, 1998.

(51) Int. Cl.
*H04N 7/00* (2006.01)

(52) U.S. Cl. .................................. 386/46; 386/68

(58) Field of Classification Search ........... 386/6–8, 386/45, 68–70, 125–126
See application file for complete search history.

(56) References Cited

U.S. PATENT DOCUMENTS 5,239,636 A * 8/1993 Dujari et al. ................ 710/52

(Continued)

FOREIGN PATENT DOCUMENTS

| EP | 0724264 | 7/1996 |
|----|---------|--------|
| EP | 0847197 | 6/1998 |

(Continued)

OTHER PUBLICATIONS

Patent Abstracts of Japan, vol. 199, No. 706, Jun. 30, 1997 & JP 9-037198 (Matsushita Electric Ind. Co.).

(Continued)

*Primary Examiner*—Robert Chevalier
*Assistant Examiner*—Helen Shibru
(74) *Attorney, Agent, or Firm*—Joseph J. Laks; Robert D. Shedd; Paul P. Kiel

(57) ABSTRACT

A method for controlling a system for processing stored information stored on a storage medium, the system including a plurality of playmodes (PMs) representing respectively different processing sequences, includes the following steps. A sequence represented by one of the plurality of PMs is played back during play mode of operation. An opportunity is provided to a user, during the play mode of operation, to select a PM from among the plurality of PMs. Then the sequence represented by the selected PM is played back during the play mode of operation. Apparatus for processing information, in this manner includes playback circuitry for retrieving information from the storage medium during a play mode of operation in one of the plurality of PMs. A user control device receives user input. A control means conditions the playback circuitry to assume a play mode of operation, select one of the plurality of PMs during the play mode of operation in response to the user input, and change to retrieve the selected one of a plurality of PMs during the play mode of operation.

11 Claims, 6 Drawing Sheets

U.S. PATENT DOCUMENTS 5,475,835 A * 12/1995 Hickey .................... 707/104.1
5,541,644 A *  7/1996 Nanba ......................... 348/96
6,434,097 B1 *  8/2002 Lewis et al. ............. 369/47.11

FOREIGN PATENT DOCUMENTS

JP         61-148571         7/1986
JP         9-037198          2/1997

OTHER PUBLICATIONS

Patent Abstracts of Japan, vol. 10, No. 348, Nov. 22, 1986 & JP 61-148571 (Uingu KK).

* cited by examiner

DIGITAL VIDEO APPARATUS USER INTERFACE

This application claims the benefit under 35 U.S.C. § 365 of International Application PCT/US99/16228, filed Jul. 20, 1999, which claims the benefit of U.S. Provisional Application Ser. No. 60/093,424, filed Jul. 20, 1998.

BACKGROUND OF THE INVENTION

1. Field of the Invention

The present invention relates to a user interface for a digital video apparatus, and in particular, a user interface for a digital video apparatus capable of processing a plurality of data blocks according to a user selected playmode.

2. Description of the Related Art

Video signal processing systems that utilize storage media having digitally compressed video and audio information recorded thereon can give the user a vast number of options for controlling playback of a video title stored on such a media. One such system that is gaining rapid acceptance comprises a video disc player adapted to process information stored in accordance with the digital video disc (DVD) specification. The information on a DVD formatted disc is recorded as discrete packets of data, in accordance with the applicable video and audio data compression standards, wherein designated packets carry data associated with various data streams, such as alternative video angles, audio tracks, subpicture streams, etc. A disc player reading a DVD formated disc may be controlled to display certain packets of data and skip over others in this manner, the DVD system can be used to prevent unauthorized access to information on a particular disc as well as seamlessly provide multiple variations of a video title, such as multiple camera angles and story endings, in accordance with user commands.

EP0847197A discloses a device for seamlessly reproducing a bitstream containing noncontinuous system time information. In particular, EP0847197A discloses an authoring system that encodes a multimedia bitstream that can be reproduced according to one scenario selected from a plurality of scenarios. The scenarios can be changed during playback, i.e., in response to user selection of a new scenario a new multimedia scenario is dynamically generated according to the most recently selected scenario. It is also possible to dynamically select and reproduce any one of the plurality of scenarios while reproducing the title content according to a desired scenario.

One useful aspect of the DVD system is that it allows the user to playback the disc contents using one of a plurality of playmodes. DVD formatted discs are generally authored to include one or more video titles, wherein each video title corresponds to a designated program unit, such as a movie or a television episode. Each video title may in turn be divided into one or more part-of-title units, also called chapters, wherein each chapter corresponds to a predetermined portion of the video title. Under this format, a disc player may be configured to playback the chapters of a particular video title in one of a plurality of playmodes. The available playmodes usually include: 1) standard, wherein the disc player plays the disc in the default sequence, usually from beginning to end; 2) random, wherein the chapters are played back in random order; and 3) program, wherein the chapters are played back in a sequence programmed by the user.

To change a disc player's playmode setting, a user ordinarily must stop disc playback, call up the appropriate player set-up menu, make the necessary selections and restart the disc playback. Even if the user is not directly required to start and stop disc playback, the disc player automatically halts playback of the disc and restarts the disc when the user selects the playmode. If the user wishes to change the playmodes frequently, the requirement to stop disc playback and navigate the disc player set-up menu can quickly become annoying. Therefore, it is desirable to allow the user to dynamically change the disc player's playmode setting during disc playback, that is, change the playmode as the video title continues to play in a portion of the display.

SUMMARY OF THE INVENTION

In accordance with the present invention a user interface, method and apparatus is provided for allowing a user to dynamically change a playmode of a digital video apparatus, in particular a DVD player. Advantageously, the present invention allows the user to dynamically change the player's playmode setting without having to stop playback of a title and then call up and navigate through the player set-up menu.

BRIEF DESCRIPTION OF THE DRAWINGS

The invention will be described with reference to the accompanying drawings, wherein.

DETAILED DESCRIPTION OF THE INVENTION

Although the exemplary embodiment is described with reference to a digital video apparatus adapted to read compressed video and audio data from a disc and to process the data in accordance with the DVD specification, it is to be understood that the present invention may be used in any digital video apparatus capable of processing digital video and audio data, wherein the data has been stored or is received in distinct data blocks and the data blocks may be played back according to a particular playback sequence.

Figure 1:
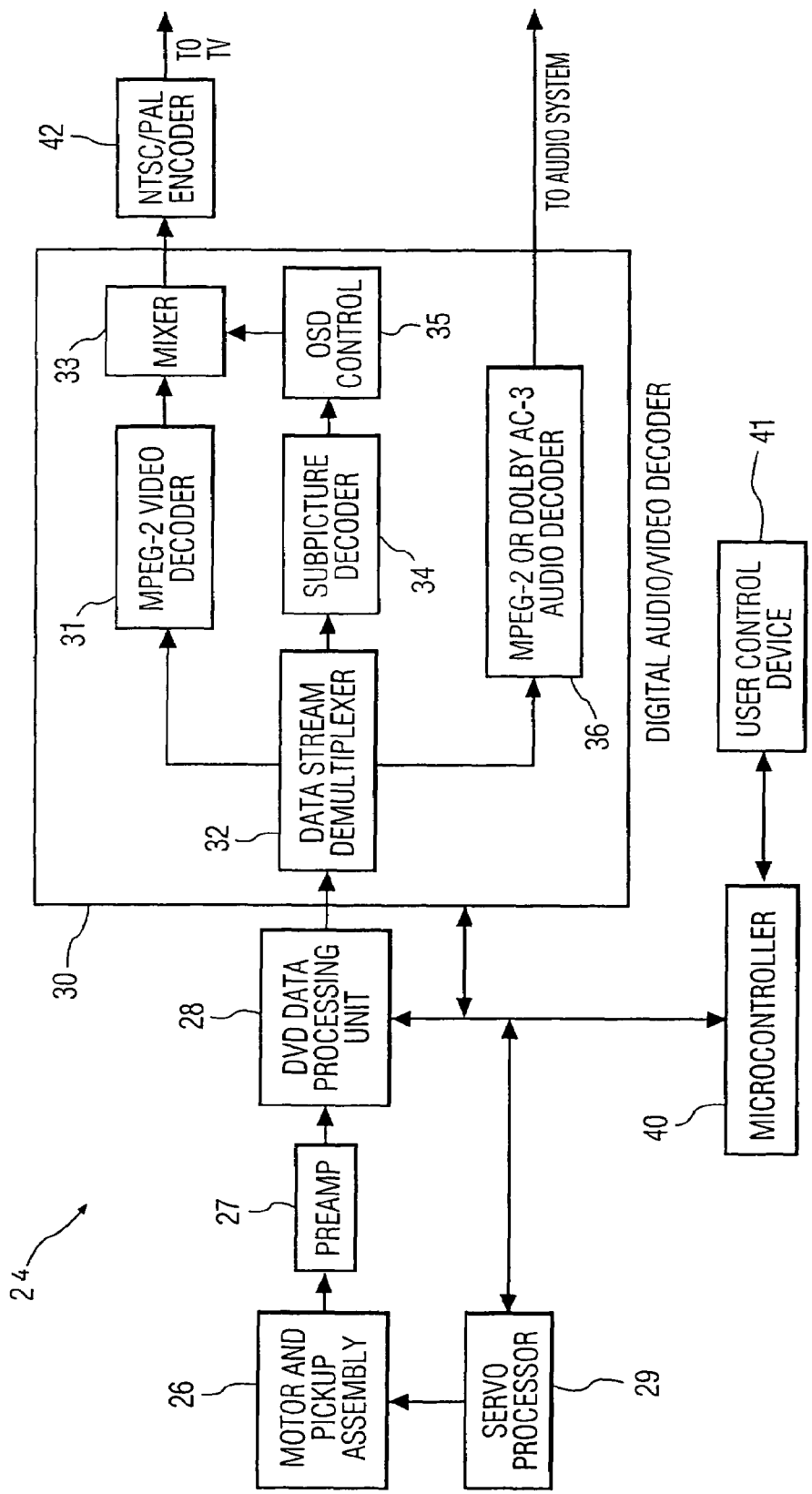
FIG. 1 is a block diagram of a digital video disc player suitable for implementing the dynamic playmode selection feature of the present invention.

FIG. 1 is a block diagram showing the basic elements of an exemplary digital video disc player suitable for implementing the dynamic playmode selection feature of the present invention. The construction and operation of these elements are generally known to one of ordinary skill in the art and will not be discussed in detail here. Disc player 24 comprises motor and pickup assembly 26 which, under the control of servo processor 29, spins the disc and reads the information stored thereon. Preamp 27 and DVD data processing unit 28 translate the electrical pulses from motor and pickup assembly 26 into digital data that can be further processed by digital audio/video decoder unit 30. DVD data processing unit 28 typically performs functions such as demodulation, error correction and descrambling of the raw data read from the disc so that the data is in a suitable format for decoder unit 30.

Decoder unit 30 receives the demodulated, error corrected and descrambled data, processes the data, and provides the appropriate video and audio signals to a display unit 18, such as a television set. Decoder unit 30 comprises data stream demultiplexer 32 which demultiplexes the data from data processing unit 28 into a plurality of separate data streams, including a video stream, an audio stream and a subpicture stream, and provides the data streams to their respective data decoders. Video decoder 31 receives the video stream and provides a video signal to mixer 33. Subpicture decoder 34 receives the subpicture stream and provides data to on-screen display (OSD) control 35 which provides OSD video signals to mixer 33. The combined video signal from mixer 33 is provided to NTSC/PAL encoder 42 which provides a video signal that conforms to the appropriate video signal standard to a video display device 18. Audio decoder 36 receives the audio streams from data stream demultiplexer 32 and provide the appropriate audio signals to an audio system.

Microcontroller 40 controls the operation of disc player 24. Microcontroller 40 is coupled to user control device 41, which may comprise IR remote control devices, front panel buttons or the like, and translates data from user control device 41 to control the operation of the various elements of disc player 24 described above. Typically, microcontroller 40 is also configured to control various access features of disc player 24 including, but not limited to, parental lock out, decryption of encrypted discs, dialing remote controllers to gain access to encrypted DVD data. Microcontroller 40 may be embodied in various forms, including, but not limited to, a dedicated integrated circuit, or a part of a decoder/controller unit. Microcontroller 40 may be comprised of one of a plurality of suitable controller units, including, but not limited to STI 5500, manufactured by SGS Thomson.

Figure 2:
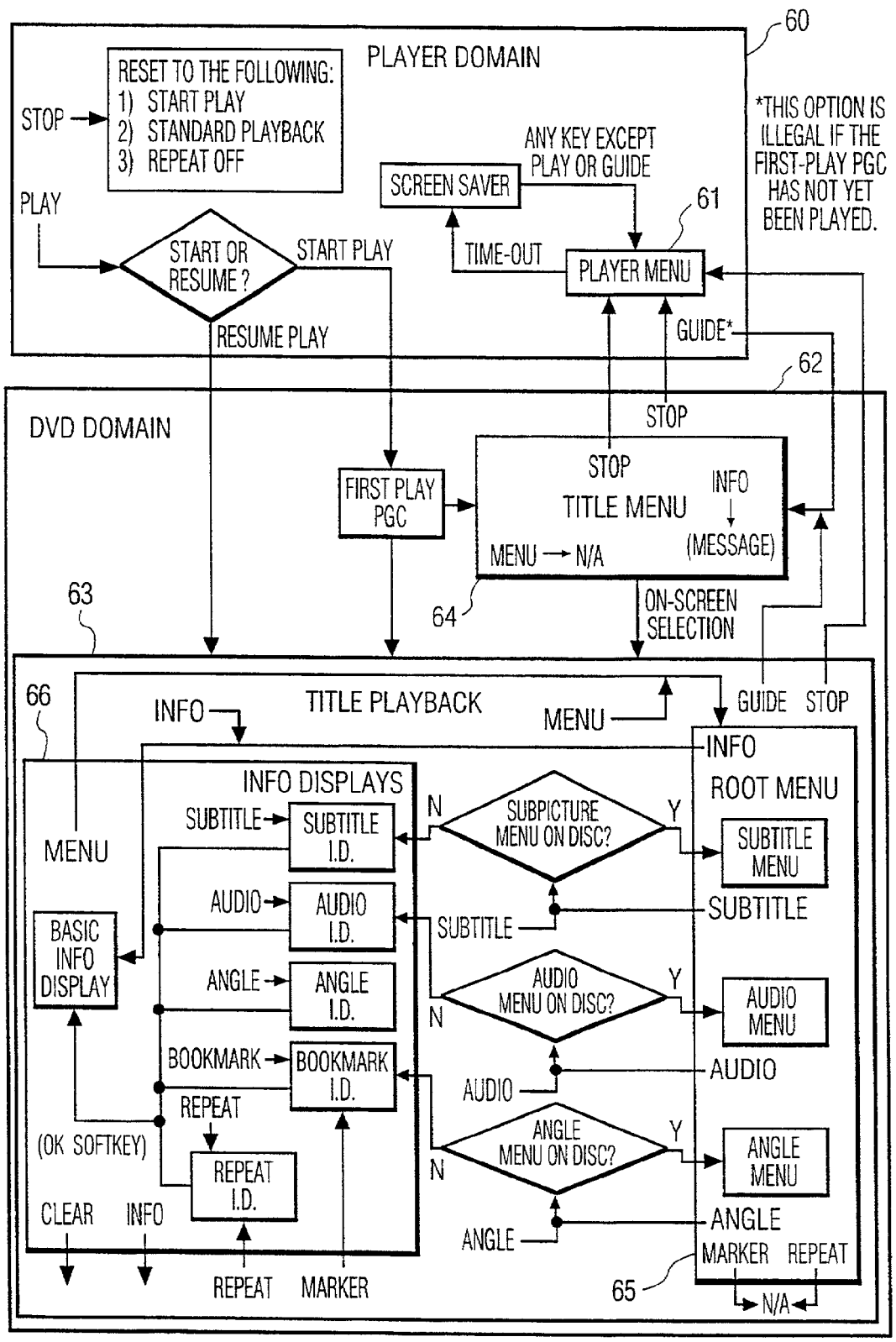
FIG. 2 is a block diagram illustrating navigation between the disc player domain and the DVD domain.

FIG. 2 illustrates the navigation scheme between player domain 60 and disc domain 62. As shown in FIG. 2, player domain 60 includes player menu 61 for allowing the user to select certain operating conditions for the player, for example parental control ratings. Also, DVD domain 62 includes title menu 64 for providing information about the respective video title. On-screen selection from title menu 64 may transfer the user to title playback block 63, which includes provisions for root menu 65. Root menu 65 may be authored onto a disc to provide information about available options on the disc including, but not limited to, subtitles, audio tracks and camera angles.

If the disc does not include a root menu 65 authored thereon, it is desirable to include a means for generating an information display, developed from the actual video and audio information stored on the disc, which identifies and displays the available options to the user. A provision for such means is indicated by information displays block 66. Although information display block 66 is shown inside DVD domain 62, the information display is generated by player 24 based on information authored on the disc. Alternatively, disc player 24 may be configured to allow the user to select information display block 66 rather than root menu 65 even if root menu 65 exists in DVD domain 62.

Figure 3:
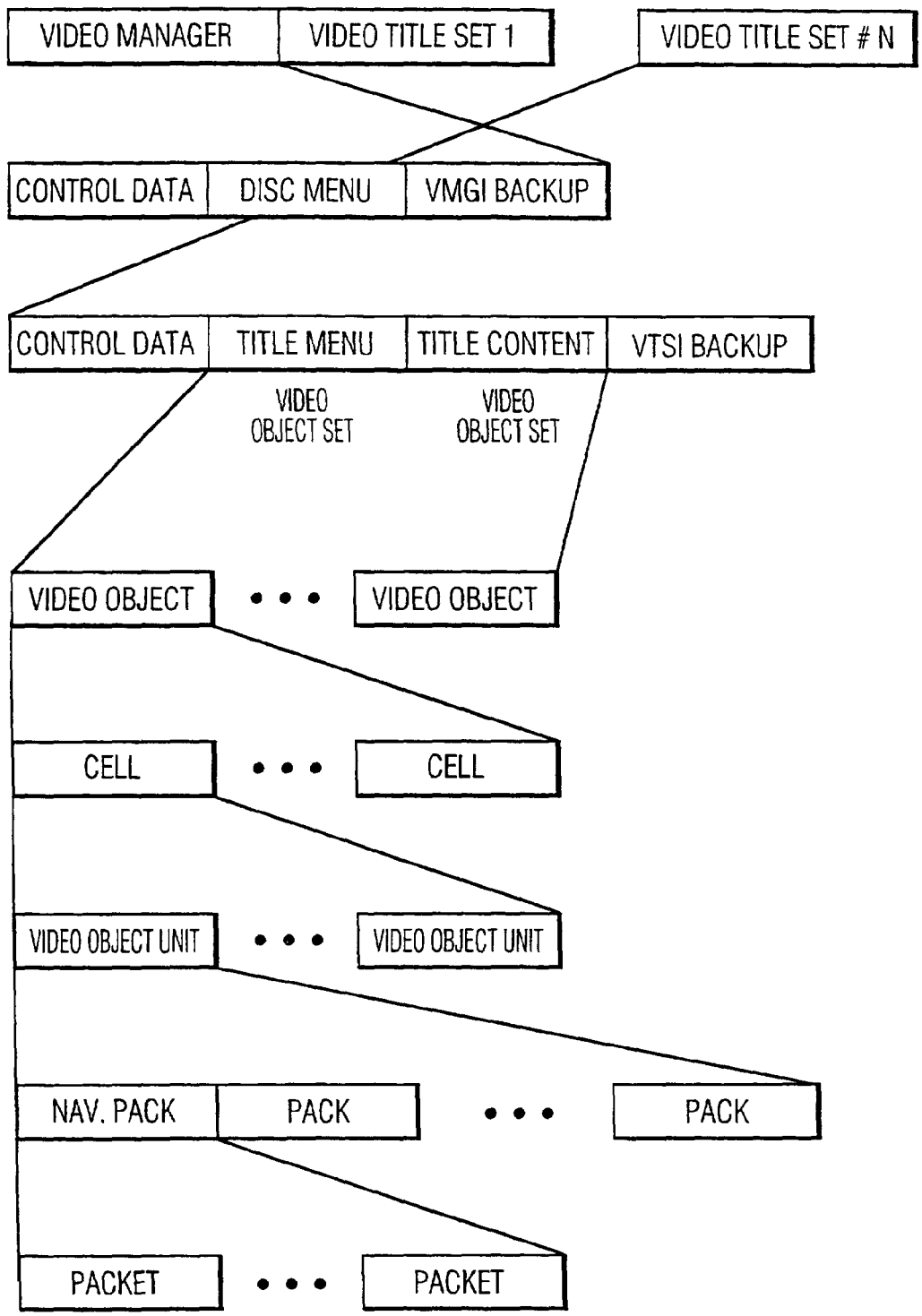
FIG. 3 is a diagram of a data structure in accordance with the DVD specification.

FIG. 3 illustrates the structure of the program data and control data stored on a disc in accordance with the DVD specification and suitable for use with disc player 24. The data structure is hierarchical, wherein each data block is divided up into component data blocks, which are further divided into smaller component data blocks. Each video title set, which corresponds to a designated program unit, for example, a movie or an episode of a television show, is comprised of video object sets, which comprises a plurality of video objects.

Each video object is comprised of a plurality of cells, which may be considered a data unit for presentation having a plurality of data unit types, such as video, audio, subpicture, etc, and corresponds to a program segment. Each cell is in turn comprised of a plurality of video object units (VOBUs). Each VOBU is comprised of a navigation pack (NAV_PACK) and a plurality of packs, which are subdivided into a plurality of packets. A VOBU generally corresponds to an MPEG-2 Group of Pictures (GOP) with an associated control data structure, the NAV_PACK. The NAV_PACK of each VOBU contains information such as sector addresses of VOBUs relative to the current one (both forwards and backwards in temporal presentation order), and the amount of elapsed time in cell presentation which corresponds to the current VOBU.

Figure 4:
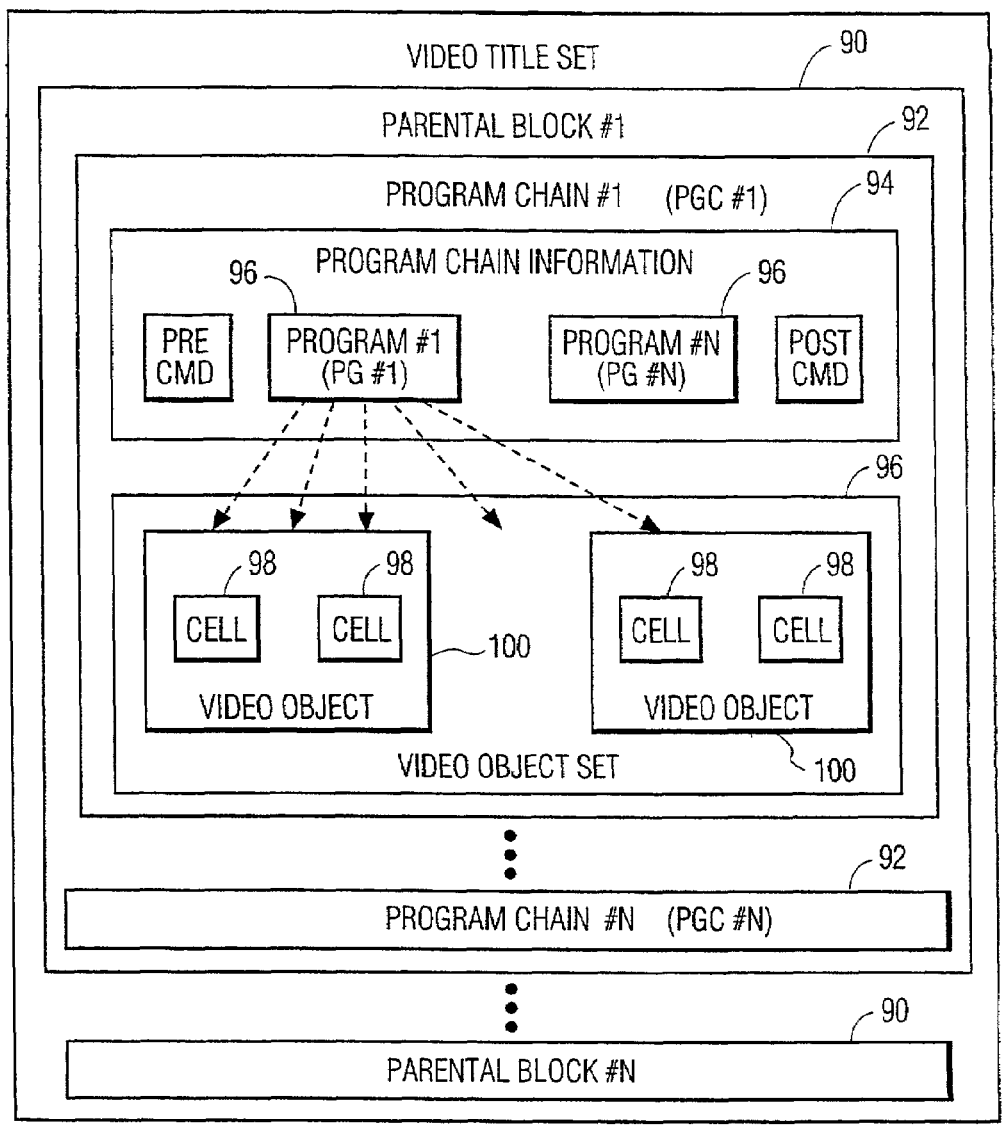
FIG. 4 is a block diagram of a presentation structure in accordance with the DVD specification.

Data stored in accordance with the DVD specification is also logically organized into a presentation structure in order to provide flexibility in the manner in which the data can be presented. FIG. 4 illustrates the presentation structure in accordance with the DVD specification and suitable for use with disc player 24. This presentation structure is overlaid onto the data structure of FIG. 3. At the base level, the presentation sequence is defined by programs (PGs) 96, each of which comprise a linked list of pointers to cells. A plurality of PGs 96 may be combined to form a program chain information (PGCI) 94, a plurality of which may in turn be combined to form program chain (PGC) 92.

During presentation of a video titles, disc player 24 selects the appropriate PGC for loading into a primary table, based on such criteria as the user selected title and parental rating preference. Thereafter, disc player 24 reads the data stored on the disc based on the linked list of pointers contained in the PGs. As is known, disc players generally utilize various look ahead algorithms in order to read the data from the disc and store the data on a system buffer prior to actual presentation in order to provide seamless presentation.

As discussed earlier, the storage medium may contain a plurality of program portions, often called chapters, which may be played back in different, user selectable orders called playmodes. Also as discussed earlier, a user is able to dynamically call up a menu and make changes to the playmode (PM) of disk player 24. This way, while watching a program on the video display being played from a storage medium through the disk player, the user is able to call up a menu and change these different playmodes (PMs) without going through the inconvenience of stopping the disk playback and trying to restart the video playback each time the user wants to make a change.

The different playmodes (PMs) available are (1) standard; (2) random; and (3) programmable PMs. The standard PM allows chapters on a disk to be played back in the default sequence which is usually from start to end. The random PM plays back chapters in a random order. The programmable PM plays back chapters in the sequence specified by the user. In response to user input, disk player 24 determines all possible PMs and which PMs are actually available for actuation. For example, the disk player 24 determines if the storage medium contains more than one chapter in the video title set. If it does not, the player cannot change the PM to random or programmable. Further, the disk player 24 determines if the plurality of chapters on the disk can be used for play back. For example, if all chapters are R-rated and the parental control rating allows only G-rated chapter playback, then the player cannot change the PM to random or programmable.

Figure 5:
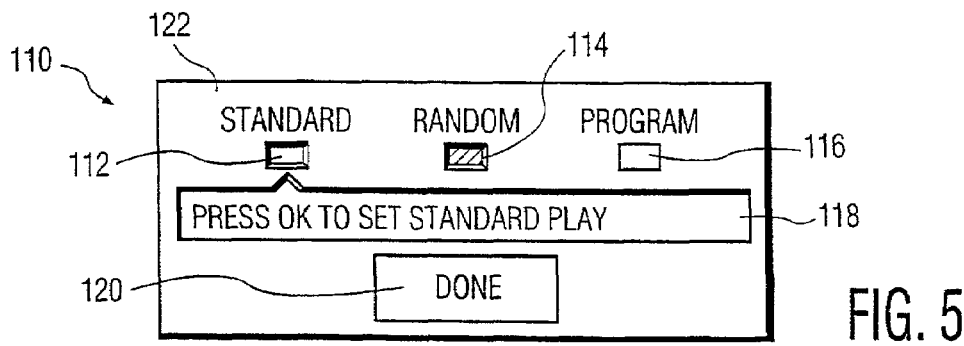
FIG. 5 is an on-screen display suitable for use with the dynamic playmode selection feature of the present invention.

After determining what PMs are possible and those that are actually available, a menu is generated (as illustrated in display 110 of FIG. 5). If the user changes the PM, the disk player will ask the user if the change affects only the current title or all future titles. The user will then use the control device 41 to make the user election. If the player elects to change the PM only for the current video title, disk player 24 would revert to the prior PM when the playback of the current title is complete, otherwise, the selected PM remains in effect until changed by the user.

The various playmodes may be implemented in disk player 24 as follows. In the standard mode, disk player 24 follows the presentation sequence defined on the disk. The presentation sequence is defined by tables in the program chain information contained in the control blocks as described above. In the random mode, disk player 24 generates a private table that maps each chapter and assigns a specific value to each chapter based on the order of play. The borders for each chapter are known based on the program chain information previously loaded in from the disk. Thereafter, a random number generator is used to randomly select a chapter for presentation and a checking algorithm may be performed to ensure that each chapter is presented at least once before any one chapter is repeated. In the programmable mode, disk player 24 accepts the desired sequence from the user and creates a private table that lists the boundary information for each of the chapters in the sequence. Thereafter, disk player 24 presents the chapters in accordance with the listing in the private table. It can be seen that disk player 24 creates the supplemental tables from the chapter boundary information that is already loaded from the disk in order to alter the presentation sequence.

It is possible to enable and disable the dynamic selection of a playmode. Enabling/disabling of the method for implementing the displaying and dynamically selecting a PM may occur by selecting the desired mode on a setup option display created by the system's on-screen display processor during a setup mode of operation. The setup mode of operation, which enables controlling various features such as video processing characteristics, sound characteristics, closed captioning, etc., in addition to PMs selection enable/disable, may be activated, for example, by pushing a control button on a remote control device. Desired features/modes/settings are selected from the displayed setup menu by using buttons on the remote control, all in a known manner.

Figure 6:
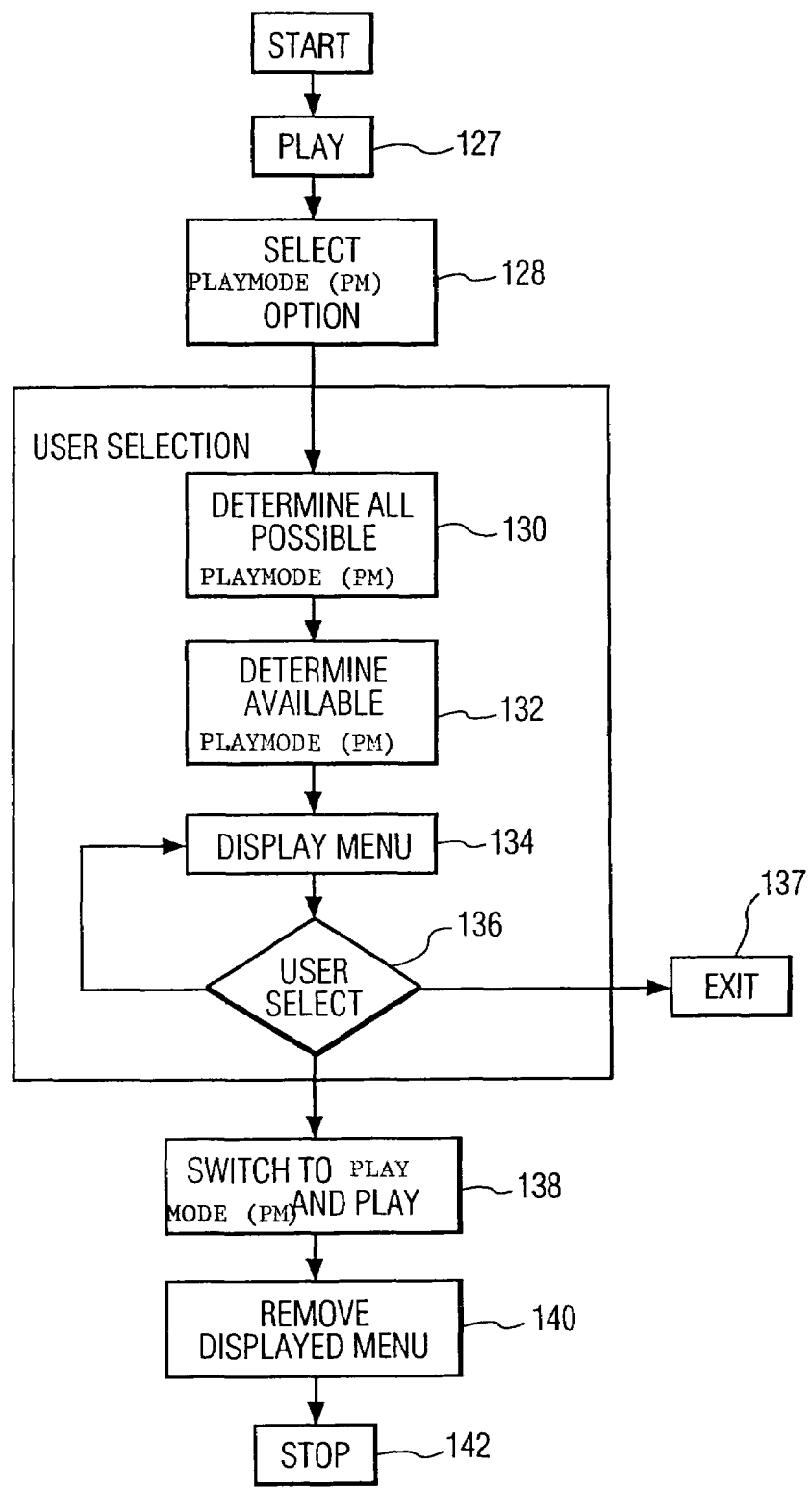
FIG. 6 is a flowchart illustrating the steps for implementing the displaying of and dynamically selecting among particular ones of a plurality of PMs on a DVD Player.

FIG. 6 is a flowchart illustrating the steps for implementing the displaying of and dynamically selecting among particular ones of a plurality of PMs on a DVD Player. In step 127, disc player 24 waits for the user to send a PLAY command and upon receiving the PLAY command searches the disk or video title set for a plurality of PMs. In step 128, the user can press a designated button 81 to give the user the opportunity to change playmodes. In step 130, disk player 24 determines all possible PMs. In step 132, disk player 24 will determine what PMs are available, i.e., those PMs not blocked with a parent block or those not enabled. In step 134, an on-screen display 110 is overlaid, in a known manner, onto the video display generated by the disk player 24 and allows the user to change the PM while continuing to watch the title playback in a background portion of the video display. The on screen display 110 distinguishes between those PMs present and available and those that are present and unavailable. The user is allowed to select an available PM in step 136. The menu display tracks the user changes of the available PMs. In step 138, disk player 24 switches the PM to the new PM and plays it. In step 140, after disk player 24 switches and plays the new data stream, the on-screen display 110 is no longer overlaid onto the video display generated by the disk player 24 and the video signal processing system returns to a normal display.

Figure 7:
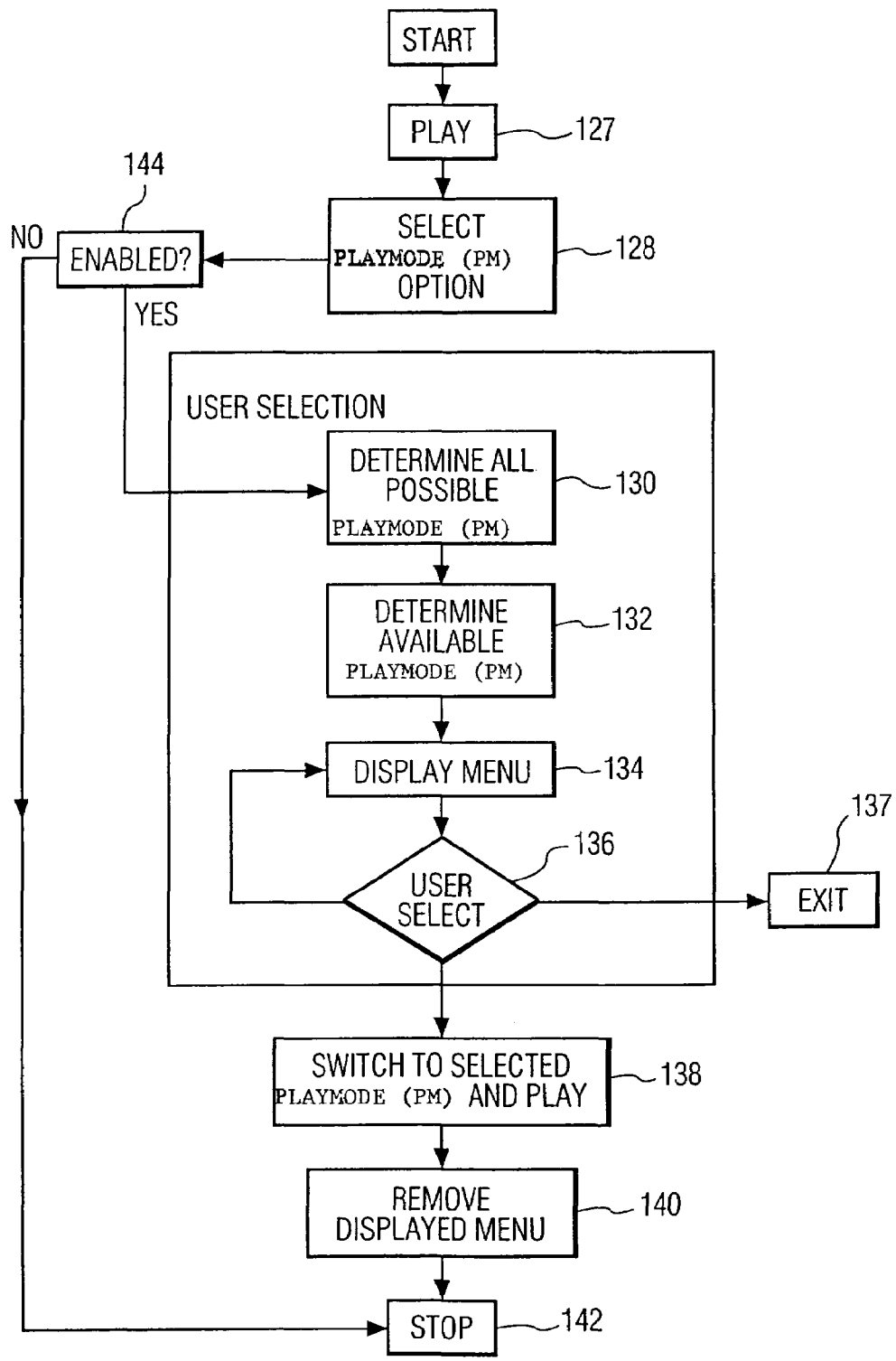
FIG. 7 shows, in flowchart form, another embodiment of the method for implementing the displaying and dynamically selecting among a plurality of PMs on a DVD disk on a DVD Player in accordance with principles of the invention.

FIG. 7 shows, in flowchart form, another embodiment of the method for implementing the displaying and dynamically selecting among a plurality of PMs on a DVD disk on a DVD Player in accordance with principles of the invention. Steps in FIG. 7 which are the same as those illustrated in FIG. 6 have the same reference number as in FIG. 6, operate in the same manner to the corresponding steps in FIG. 6 as described above, and will not be described again here. The arrangement depicted in FIG. 7 provides for selectively enabling the mode of operation in which user selects one of a plurality of different PMs. Specifically, FIG. 7 includes step 144 following step 128 which tests to determine if the access to PM is enabled. If the access to dynamically change the PM is disabled (A "NO" result at step 146), then step 144 is followed by step 142 which exits the routine without providing the user an opportunity to change the PM. In this case, changing the PM must occur prior to activation of the playback mode by navigating the usual setup menus as described above if a user desires. Otherwise, step 130, and following steps, are performed allowing a user to select a playmode.

It will be apparent to those skilled in the art that although the present invention has been described in terms of an exemplary embodiment, modifications and changes may be made to the disclosed embodiment without departing from the essence of the invention. Also, it is herein recognized that the present playmode selection feature may be implemented using any one of a number of conventionally known methods, or combination of methods, for controlling the various elements of disc player 24 described above, for example by using embedded software in a microcontroller. Therefore, it is to be understood that the present invention is intended to cover all modifications as would fall within the true scope and spirit of the present invention.

The invention claimed is:

1. A method for controlling a system for processing a plurality of data units stored on a storage medium, the system adapted to process a sequence of the data units in accordance with one of a plurality of possible playmodes comprising standard, random and programmed playmodes, the method comprising the steps of:

(A) playing back the data units according to one of the plurality of playmodes during a PLAY mode of operation, (B) determining which of the possible playmodes are actually available for actuation during playback of the data units on the storage medium, and generating an on-screen display menu displaying the actually available playmodes to thereby provide to a user, during the PLAY mode of operation, an opportunity to select another one of the actually available playmodes, the plurality of playmodes including a standard playmode representing a default sequence, a random playmode representing a random sequence and programmed playmode representing a sequence specified by a user, without interrupting playback of a current sequence of data units, and (C) in response to user selection of a new playmode, changing the playback sequence of the data units in accordance with the newly selected playmode.

2. The method of claim 1, wherein step (B) comprises the step of generating the on-screen display menu includes overlaying the menu onto a video display which allows the user to select one of the plurality of playmodes while continuing to watch the playback of the data units in a background portion of the video display.

3. The method of claim 2, wherein step (B) is preceded by the step of determining whether a mode of operation enabling selection of one of the plurality of playmodes during the PLAY mode of operation is enabled; and performing steps (B) and (C) only if the mode of operation enabling modification of the plurality of playmodes during the PLAY mode of operation is enabled.

4. The method of claim 3, wherein the step of determining whether user modification of a playmode is enabled is preceded by the step of determining whether the system is in the PLAY mode of operation.

5. The method of claim 4, wherein:

the system comprises a DVD player and the storage medium comprises a DVD disk;

the DVD disk includes a plurality of chapters; and the plurality of playmodes represent respectively different sequences of chapters.

6. The method of claim 1, step (C) is preceded by the step of allowing the user to select whether the newly selected playmode will be effective for all future playbacks or only the current playback.

7. Apparatus for processing data units stored on a storage medium according to a particular playback sequence, the apparatus comprising:

playback circuitry for accessing and processing data units stored on the storage medium during a PLAY mode of operation;

a user control device for receiving user input; and a control unit, coupled to the playback circuitry and the user control device, for conditioning the playback circuitry to activate the PLAY mode of operation and process the data units in a particular playback sequence in response to user selection of one of a plurality of playmodes, wherein the control unit determines which of a plurality of possible playmodes are actually available for actuation during playback of the data units on the storage medium and is coupled to an on-screen display control for generating an on-screen display menu displaying the actually available playmodes for providing to a user during the PLAY mode of operation an opportunity to select from among the actually available playmodes associated with the data units, the plurality of playmodes including a standard playmode representing a default sequence, a random playmode representing a random sequence and programmed playmode representing a sequence specified by a user, without interrupting the PLAY mode of the playback circuitry, and, in response to user selection of a new playmode, changing the playback sequence of the data units in accordance with the newly selected playmode.

8. The apparatus of claim 7, wherein the on-screen display menu is overlaid over the video for allowing the user to select one of the plurality of playmodes while watching a playback of a current sequence of data units in a background portion of the video display.

9. The apparatus of claim 7, wherein the control unit determines whether a mode of operation enabling selection of one of the plurality of playmodes during the PLAY mode of operation is enabled; and provides an opportunity to select a new playmode without interrupting the PLAY mode only if the mode of operation enabling modification of the plurality of playmodes during the PLAY mode of operation is enabled.

10. The apparatus of claim 7, wherein the playback circuitry comprises means for accessing and processing data from a DVD disk and the storage medium comprises a DVD disk, wherein the DVD disk includes a plurality of chapters; and the plurality of playmodes represent respectively different sequences of chapters.

11. The apparatus of claim 7, wherein the control unit provides an on-screen display to allow the user to select whether the newly selected playmode will be effective for all future playbacks or only the current playback.

* * * * *